united States Patent Office 3,732,166
Patented May 8, 1973

3,732,166
PROCESS OF CLEANING WELLS WITH CARBON DISULFIDE EMULSIONS
Kenneth J. Lissant, St. Louis, Mo., assignor to Petrolite Corporation, Wilmington, Del.
No Drawing. Original application Dec. 17, 1969, Ser. No. 886,016, now Patent No. 3,700,594, dated Oct. 24, 1972. Divided and this application Sept. 15, 1971, Ser. No. 180,877
Int. Cl. E21b 43/00
U.S. Cl. 166—304      6 Claims

ABSTRACT OF THE DISCLOSURE

Non-Newtonian formulations containing carbon disulfide ($CS_2$) of reduced toxicity and flammability. These formulations are illustrated by high internal phase ratio (HIPR) emulsions containing carbon disulfide in the internal phase, said internal phase containing more than about 60% of the formulation by volume and preferably more than about 80% of the formulation by volume. These formulations are particularly useful in cleaning oil and gas wells by the removal of wax and/or sulfur.

Division of Ser. No. 886,016, filed Dec. 17, 1969, now U.S. Pat. No. 3,700,594, patented on Oct. 24, 1972.

Carbon disulfide has long been known as a particularly effective solvent for paraffinic hydrocarbons, such as wax, organic polymers such as rubber and relatively insoluble inorganic materials such as elemental sulfur. Because of these properties, carbon disulfide has been employed for many years in a number of processes for the solution and/or removal of contaminates from certain systems. More particularly, it has been employed in the petroleum industry for the removal of wax and/or sulfur from oil and gas wells so as to operate at capacity.

However, carbon disulfide is extremely toxic, highly volatile and extremely flammable and the hazards associated with it have considerably reduced its use. One method for reducing somewhat the fire hazards is described in U.S. Pat. 3,375,192 to H. C. Rowlinson which teaches the incorporation of 8 to 16% by volume of pentane and similar hydrocarbons into the carbon disulfide to significantly reduce its volatility and ignition hazard. While this technique reduces the ignition temperature of carbon disulfide, it does not significantly retard the volatility of the mixture and considerable hazard is still involved in employing such mixtures.

I have now discovered that non-Newtonian formulations such as HIPR emulsions of carbon disulfide in water or mixtures of carbon disulfide and hydrocarbon in water may be employed in essentially the same manner as unemulsified carbon disulfide, but that the non-Newtonian character of the emulsified compositions greatly reduces the hazards of such use. The ease of handling is brought about by a number of properties of the emulsions. First, since these emulsions have non-Newtonian properties, i.e. when under moderate shear forces, they behave like elastic solids. However, when subjected to greater shear forces they flow and produce relatively fluid systems. Stated another way, although these emulsions can be pumped with relative ease when at rest, they behave like solids or semi-solids. This means that should a leak occur in a system or should the material be spilled rather than spreading widely as in the case with straight carbon disulfide and carbon disulfide-hydrocarbon mixtures, the composition behaves like a solid and stays in place. Furthermore, these emulsions exhibit significantly less volatility than the straight $CS_2$ liquid formulations and, therefore, the build up of dangerous concentration of fumes, from a toxicity and flammability standpoint, is greatly retarded.

Since the purpose of the emulsion is to obtain the advantages of $CS_2$ in the regard to the removal of wax and/or sulfur while reducing its toxicity, volatility and flammability, $CS_2$ is employed in the internal phase, the external phase being essentially insoluble in $CS_2$. Since water is inexpensive, relatively non-volatile and non-flammable, it is generally employed although other solvents or mixtures of solvents substantially insoluble in $CS_2$ can be employed.

In practice the amount of $CS_2$ employed in the internal phase should be consistent with maximizing its function in wax and/or sulfur removal consistent with minimizing flammability. Thus, in practice the emulsion comprises in excess of 90% $CS_2$, such as in excess of 95%, but can be as high as 98–99%. If desired, lesser amounts of $CS_2$ can be employed such as 60%, 70%, 80%, 85% or more. However, since the prime purpose of the emulsion is to maximize the effect of $CS_2$ it is not desirable to employ large amounts of water. Thus, it is preferred to employ as high a $CS_2$ internal phase as possible consistent with maximizing low inflammability.

In addition the emulsions can be prepared from a solution of $CS_2$ in another solvent. This is best exemplified by $CS_2$-pentane mixtures described in U.S. Pat. 3,375,192 which is by reference incorporated into this present application as if part hereof.

Suitable mixtures comprise 92–84% by volume of $CS_2$ and 8–16% by volume of pentane. It is often convenient to employ petroleum pentane, a commercial product containing approximately 90% n-pentane. This is the saturated $C_5$ hydrocarbon cut in petroleum refining. Pure n-pentane is equally effective. The boiling range of petroleum pentane is about 34.5–38° C.

The emulsions employed in this invention are high-internal-phase-ratio emulsions. These high-internal-phase-ratio emulsions are pseudo-plastic fluids; that is, rather than exhibiting Newtonian viscosity properties, the apparent viscosity of the formulation is a function of the rate of shear. Simply stated, these fluids behave like elastic solids when at rest or when subjected to forces below their yield point. Above their yield point they begin to flow, and at normal pumping velocities their viscosity is close to the viscosity of the external phase employed. I have found that such emulsions can be pumped through a pipe inexpensively and effectively. These emulsions contain an internal phase which is the major part of the emulsions; for example, at least about 60%, such as at least about 80%, but preferably in excess of about 90% by volume.

The thixotropic emulsions of this invention, which have the characteristics of solids at rest and liquids when force is exerted on them, have the following advantages:

(1) Nonadhesive—They do not tend to stick to the sides of the container or piping system.

(2) Viscosity—The apparent rest viscosity is greater than 1000 cps., generaly in the range of 10,000–100,000 or greater, preferably 50,000–100,000 cps. or more. However, under low shear, they will flow with a viscosity approaching that of the liquid phases. On removal of shear, the recovery to original apparent rest viscosity is nearly instantaneous. The hysteresis loop is very small.

(3) Temperature stability—Increased temperature has little effect on viscosity until the critical stability temperature is reached at which point the emulsion breaks into its liquid components. This permits a wide temperature range of operation.

(4) Shear stability—Emulsions may be subjected repeatedly to shear without degradation so long as the critical shear point is not reached. At this point the emulsion breaks. However, the critical shear point is sufficiently high to permit pumping at high rates.

(5) Quality control—With these emulsions it is easy to reproduce batches with identical properties due to the absence of any "gel" structure.

The following patents and applications, which are by reference incorporated into the present application, relate to stable, viscous thixotropic HIPR emulsions and to the uses, preparation, etc., of these emulsions. They describe the type of HIPR emulsions, the general processes of preparation, the type of emulsifiers employed, etc.

| U.S. Patent | Application Serial No. | Filed | Title | Related patent application |
|---|---|---|---|---|
| | 599,332 | Oct. 19, 1966 | Stable emulsions | Continuation-in-part of S.N. 286,877 and now abandoned. |
| | 286,877 | May 20, 1963 | ____do____ | Now abandoned. |
| | 302,177 | Aug. 14, 1963 | Hybrid Fuel I | Do. |
| 3,352,109 | 547,581 | May 4, 1966 | Hybrid thixotropic rocket and jet fuels comprising oil-in-water emulsion. | Continuation of S.N. 302,177. |
| | 411,103 | Nov. 13, 1964 | Emulsions preparation | Now abandoned. |
| 3,378,418 | 541,738 | Apr. 11, 1966 | Method of resolving thixotropic jet and rocket emulsions | |
| 3,490,237 | 565,702 | July 18, 1966 | Thixotropic oil-in-water emulsion fuels | |
| 3,539,406 | 637,332 | May 10, 1967 | Essentially nonaqueous emulsions | |
| 3,396,537 | 302,001 | Aug. 14, 1963 | Hybrid Fuel II | |
| 3,565,817 | 753,340 | Aug. 15, 1968 | Continuous process for preparation of emulsions | Continuation-in-part of S.N. 411,103. |

The type of thixotropic emulsions described herein have been amply described in the above patent applications. It should be noted that these emulsions can be prepared by any suitable emulsifying agent. Although oxyalkylates are preferred, other types of suitable emulsifiers can be employed.

By using the means of selecting suitable emulsifiers described in the above applications, one can select and employ emulsifiers, for example, of the following types:

(I) ANIONIC (A) Carboxylic acids:
   (1) Carbonyl joined directly to the hydrophobic group (subclassification on basis of the hydrophobic group), e.g. fatty acids, soaps, rosin soaps, etc.
   (2) Carboxyl joined through an intermediate linkage.
     (a) Amide group as intermediate link.
     (b) Ester group as intermediate link.
     (c) Sulfoamide group as intermediate link.
     (d) Miscellaneous intermediate links, ether, —$SO_2$—, —S—, etc.

(B) Sulfuric esters (sulfates)
   (1) Sulfate joined directly to hydrophobic group.
     (a) Hydrophobic group contains no other polar structures (sulfated alcohol and sulfated olefin type).
     (b) Sulfuric esters with hydrophobic groups containing other polar structures (sulfated oil type).
   (2) Sulfate group joined through intermediate linkage.
     (a) Ester linkage (Artic Syntex M. type).
     (b) Amide linkage (Xynomine type).
     (c) Ether linkage (Triton 770 type).
     (d) Miscellaneous linkages (e.g., oxyalkylimidazole sulfates).

(C) Alkane sulfonic acids
   (1) Sulfonic group directly linked
     (a) Hydrophobic group bears other polar substituents ("highly sulfate oil" type). Chloro, hydroxy, acetoxy, and olefin sulfonic acids (Nytron type).
     (b) Unsubstituted alkane sulfonic acids (MP 189 type: also cetane sulfo acid type).
     (c) Miscellaneous sulfonic acids of uncertain structure, e.g., oxidation products of sulfurized olefins, sulfonated rosin, etc.
   (2) Sulfonic groups joined through intermediate linkage.
     (a) Ester linkage.
       (1) RCOO—X—$SO_3H$ (Igepon AP type).
       (2) RNHOC—X—$SO_3H$ (sulfosuccinamide type).
     (c) Ether linkage (Triton 720 type).
     (d) Miscellaneous linkages and two or more linkages.

(D) Alkyl aromatic sulfonic acids
   (1) Hydrophobic group joined directly to sulfonated aromatic nucleus (subclasses on basis of nature of hydrophobic group. Alkyl phenols, terpene, and rosin-aromatic condensates, alkyl aromatic ketones, etc.).
   (2) Hydrophobic group joined to sulfonated aromatic nucleus through as intermediate linkage.
     (a) Ester linkage (sulfophthalates, sulfobenzoates).
     (b) Amide and imide linkages.
       (1) R—CONH—Ar$SO_3H$ type.
       (2) Sulfobenzamide type.
     (c) Ether linkage (alkyl phenyl ether type).
     (d) Heterocyclic linkage (Ultravon type, etc.).
     (e) Miscellaneous and two or more links.

(E) Miscellaneous anionic hydrophilic groups
   (1) Phosphates and phosphonic acids.
   (2) Persulfates, thiosulfates, etc.
   (3) Sulfonamides.
   (4) Sulfamic acids, etc.

(II) CATIONIC (A) Amine salts (primary, secondary, and tertiary amines)
   (1) Amino group joined directly to hydrophobic group.
     (a) Aliphatic and aromatic amino groups.
     (b) Amino group is part of a heterocycle (alkaterge type).
   (2) Amino group joined through an intermediate link.
     (a) Ester link.
     (b) Amide link.
     (c) Ether link.
     (d) Miscellaneous links.

(B) Quaternary ammonium compounds
   (1) Nitrogen joined directly to hydrophilic group.
   (2) Nitrogen joined through an intermediate link.
     (a) Ester link.
     (b) Amide link.
     (c) Ether link.
     (d) Miscellaneous links.

(C) Other nitrogenous bases
   (1) Non-quaternary bases (classified as guanidine, thiuronium salts, etc.).
   (2) Quaternary bases.

(D) Non-nitrogenous bases
   (1) Phosphonium compounds.
   (2) Sulfonium compounds, etc.

(III) NON-IONIC (A) Ether linkage to solubilizing groups.
(B) Ester linkage.
(C) Amide linkage.
(D) Miscellaneous linkages.
(E) Multiple linkages.

(IV) AMPHOLYTIC
(A) Amino and carboxy
  (1) Non-quaternary.
  (2) Quaternary.
(B) Amino and sulfuric ester
  (1) Non-quaternary.
  (2) Quaternary.
(C) Amine and alkane sulfonic acid.
(D) Amine and aromatic sulfonic acid.
(E) Miscellaneous combinations of basic and acidic groups.

The following examples are presented for purposes of illustration and not of limitation. Oxyalkylations were carried out by the general procedure described in U.S. Pat. 2,572,886, Example 1a, columns 9 and 10.

Emulsifier A

An emulsifier was prepared by oxyalkylating 1,3-butanediol with 3.0 parts by weight of butylene oxide, 32.2 parts of propylene oxide and 16.6 parts of ethylene oxide in the order given.

Emulsifier B

An emulsifier was prepared by oxyalkylating triethyleneglycol with 5.1 parts by weight of butylene oxide, 30.0 parts of propylene oxide and 22 parts of ethylene oxide in the order given.

Emulsifier C

An emulsifier was prepared by oxyalkylating octyl phenol with 0.69 part by weight of ethylene oxide.

In addition non-oxyalkylated emulsifiers can also be employed.

The following example illustrates the preparation of a thixotropic water external-$CS_2$ high internal phase emulsion.

EXAMPLE 1

Three quarts of water and 150 ml. of Emulsifier A were thoroughly mixed. One gallon of $CS_2$ was then added and mixed into this material until a smooth emulsion was formed. This premix was then placed into a 20 gallon open mixing vessel, equipped with an anchor type stirrer. With the stirrer revolving at about 200 r.p.m., additional $CS_2$ was added until a total of ten gallons of $CS_2$ had been mixed in. The result was a white, highly thixotropic, oil-in-water emulsion.

The following example illustrates the preparation of a thixotropic water external-$CS_2$ high internal phase emulsion.

EXAMPLE 2

A two inch diameter, Viking pump, driven by an electric motor at 805 r.p.m., was equipped with an eight foot flexible hose on the outlet and a similar flexible hose on the inlet. The ends of the two hoses were placed in a 50 gallon, open head, steel drum. With this arrangement, material could be pumped out of the drum, through the pump, and back into the drum.

One gallon of water and one pint of Emulsifier B were mixed together and placed in the steel drum. While this material was circulated by the pump, $CS_2$ containing 15% n-pentane was slowly added to the intake of the pump. In about 15 minutes, 50 gallons of $CS_2$ and pentane had been added and the result was a thick, white, jelly-like emulsion.

EXAMPLE 3

A 400-ml. tall-form (dye pot) beaker, split-disc stirrer, variable-speed stirring motor is set up so that the tall-form beaker is clamped securely and the split-disc stirrer situated as close to the bottom of the beaker as possible. Provision is made for raising the stirrer during the course of the emulsification.

Five to 10 ml. of water containing the emulsifier is placed in the tall-form beaker, and the stirring motor set to stir at a low speed. Excessive splashing is avoided. Two to 3 ml. of $CS_2$ is added and the mixture allowed to stir until homogeneous. Additional 2- to 3-ml. increments of $CS_2$ are added with thorough mixing until approximately 25 ml. of $CS_2$ has been added. At this point the emulsion has the consistency of thick cream. Internal phase is now added more rapidly, being careful never to add a volume of internal phase larger than the amount of emulsion already present in the beaker. Addition of $CS_2$ is continued until the desired phase ratio is obtained. As the level of liquid increases in the beaker, the stirrer is raised and the speed increased to insure thorough mixing. Excessive incorporation of air is avoided. When phase ratios in excess of 90% are obtained, the material will have the appearance of a stiff gel.

EXAMPLE 4

An emulsion having an internal phase ratio of 90 parts of carbon disulfide to 10 parts of an aqueous external phase containing 20% by weight of Emulsifier C was prepared according to the method of Example 3.

EXAMPLE 4A

A similar emulsion was prepared having an internal phase ratio of 75 volumes of carbon disulfide to 25 volumes of the same aqueous external phase.

EXAMPLE 4B

These two emulsions were compared with straight carbon disulfide by placing weighed amounts of the carbon disulfide or of the emulsion into a thermal gravemetric analysis cell (TGA) and measuring the rate of weight loss with time. Straight carbon disulfide was tested with no gas flowing through the cell and with 25, 60, 95 and 150 ml./min. of nitrogen flowing through the cell. The unit was started at room temperature and operated isothermally. It was found that the time required to evaporate 25 milligrams of carbon disulfide varied only slightly with the rate of nitrogen flow and averaged out at approximately 2½ minutes. By comparison, the 75–25 HIPR carbon disulfide emulsion at the end of 2½ minutes had shown less than 20% of a 20 milligram sample evaporated and the 90–10 emulsion was less than 20% evaporated. In a similar test, 100 milligrams of each of the two emulsions was placed in the TGA apparatus and it was found that at the end of seven minutes each of the emulsion samples had lost only approximately 10% of their total weight. Under similar conditions, straight carbon disulfide would have been completely evaporated. It can thus be seen that the emulsions possess volatility rates at least 10 times lower than those to be obtained with either carbon disulfide or carbon disulfide hydrocarbon mixtures.

USE EXAMPLES

The thixotropic carbon disulfide emulsions of this invention can be employed in those processes where $CS_2$ is now employed, in which it is desirable to avoid the hazards associated with its use. For example they can be employed in removing wax and/or sulfur from oil and gas wells.

The emulsions of Example 4 or 4A are pumped down the oil or gas well and allowed to remain within the well until the wax and/or sulfur has been dissolved. The dissolved and entrained solids are then flushed from the well.

As is quite evident, any suitable emulsifier is useful in my invention. It is, therefore, not only impossible to attempt a comprehensive catalogue of such emulsifiers, but to attempt to describe the invention in its broader aspects in terms of specific chemical names of emulsifier used would be too voluminous and unnecessary since one skilled in the art could by following the description of the invention herein select a useful emulsifier. This invention lies in the use of suitable emulsifiers on conjunction with $CS_2$ or $CS_2$-containing compositions and aqueous fluids or other non-oily materials and their individual compositions are important only in the sense that they can prepare suitable emulsions. To precisely define each specific useful emulsifier in light of the present disclosure would merely call for chemical knowledge within the skill of the art in a manner analogous to a mechanical engineer who prescribes in the construction of a machine the proper materials and the proper dimensions thereof. From the description in this specification and with the knowledge of a chemist, one will know or deduce with confidence the applicability of specific emulsifiers suitable for this invention by applying them in the process set forth herein. In analogy to the case of a machine, wherein the use of certain materials of construction or dimensions of parts would lead to no practical useful results, various materials will be rejected as inapplicable where others would be operative. I can obviously assume that no one will wish to use a useless emulsifier system nor will be misled because it is possible to misapply the teachings of the present disclosure to do so. Thus, any emulsifier that can form the desired emulsion can be employed.

Having thus described my invention, what I claim as new and desire by Letters Patent is:

1. A process of cleaning oil and gas wells to remove wax and/or sulfur which comprises treating the well with a thixotropic high internal phase ratio carbon disulfide in water or mixture of carbon disulfide and hydrocarbon in water emulsion comprising (1) water, (2) carbon disulfide or mixture of carbon disulfide and hydrocarbon, and (3) a non-ionic polyoxyalkyleneether emulsifying agent, said carbon disulfide being present in an amount of at least 75% carbon disulfide by volume of the emulsion, said emulsion having the characteristics of an elastic solid when at rest and of a liquid when a force is exerted on it.

2. The process of claim 1 where (2) is carbon disulfide.

3. The process of claim 2 where said carbon disulfide is present in said emulsion in an amount of at least 90% by volume of the emulsion.

4. The process of claim 1 where said carbon disulfide is present in said emulsion in an amount of at least 80% by volume of the emulsion.

5. The process of claim 1 where (2) is a mixture of carbon disulfide and pentane, said mixture comprising 92–84% by volume of carbon disulfide and 8–16% by volume of pentane.

6. The process of claim 3 where (2) is carbon disulfide.

References Cited

UNITED STATES PATENTS

| | | | |
|---|---|---|---|
| 2,358,665 | 9/1944 | Shapiro | 252—8.55 |
| 3,375,192 | 3/1968 | Rowlinson | 252—8.55 |
| 241,505 | 5/1881 | Motay et al. | 424—161 X |
| 1,772,511 | 8/1930 | Hartzell et al. | 424—161 |
| 2,742,426 | 4/1956 | Brainerd | 252—8.55 |
| 3,378,418 | 4/1968 | Lissant | 252—330 |
| 3,396,537 | 8/1968 | Lissant et al. | 44—51 X |

HERBERT B. GUYNN, Primary Examiner

U.S. Cl. X.R.

166—312; 252—8.55 B